(12) United States Patent
Chang

(10) Patent No.: US 6,514,315 B1
(45) Date of Patent: Feb. 4, 2003

(54) APPARATUS AND METHOD FOR COLLECTING FLUE GAS PARTICULATE WITH HIGH PERMEABILITY FILTER BAGS

(75) Inventor: Ramsay Chang, Los Altos, CA (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 09/628,078

(22) Filed: Jul. 28, 2000

Related U.S. Application Data

(60) Provisional application No. 60/146,417, filed on Jul. 29, 1999.

(51) Int. Cl.[7] .................................................. B03C 3/155
(52) U.S. Cl. .............................. 95/70; 55/341.1; 96/55; 110/216
(58) Field of Search .............................. 95/70, 63, 69; 96/55, 66, 57–59; 55/372, 381, 382, 528, 341.1, 341.2, DIG. 5; 110/216, 217

(56) References Cited

U.S. PATENT DOCUMENTS

| | | | | | |
|---|---|---|---|---|---|
| 1,853,393 A | * | 4/1932 | Anderson | ............... | 96/59 X |
| 3,915,676 A | * | 10/1975 | Reed et al. | ............... | 96/59 X |
| 3,966,435 A | * | 6/1976 | Penney | ............... | 96/66 |
| 4,147,522 A | * | 4/1979 | Gonas et al. | ............... | 96/59 X |
| 4,354,858 A | * | 10/1982 | Kumar et al. | ............... | 95/69 X |
| 4,357,151 A | * | 11/1982 | Helfritch et al. | ............... | 96/66 X |
| 4,411,674 A | * | 10/1983 | Forgac | ............... | 55/341.2 X |
| 5,024,681 A | * | 6/1991 | Chang | ............... | 95/70 |
| 5,158,580 A | * | 10/1992 | Chang | ............... | 95/70 |
| 5,496,396 A | * | 3/1996 | Allan et al. | ............... | 55/DIG. 5 |
| 5,888,274 A | * | 3/1999 | Frederick | ............... | 55/528 X |
| 6,110,249 A | * | 8/2000 | Medcalf et al. | ............... | 55/528 X |

* cited by examiner

Primary Examiner—Richard L. Chiesa
(74) Attorney, Agent, or Firm—Pennie & Edmonds LLP

(57) ABSTRACT

A method of treating flue gas includes the steps of generating a flue gas and removing particulate from the flue gas with a first particulate removal technique to produce treated flue gas. The treated flue gas is then applied to a high permeability barrier filter to remove additional particulate from the treated flue gas. The high permeability filter includes high permeability filter bags with air permeability greater than 75 actual cubic feet per minute of air flow per square foot of filter surface area at a pressure drop of one half inch water.

6 Claims, 3 Drawing Sheets

Fabric Specifications

| Fabric | Baseline Ryton Felt | Test 1: 6-Denier Ryton 2632 | Test 2: Woven Glass 7587 | Test 3: Woven Rastex A144 | Test 4: Woven Ryton 2638 | Test 5: Woven Teflon T-20 |
|---|---|---|---|---|---|---|
| Faberic Permeabliity (cfm) | 37 | 113 | 135 | 208 | 66 | 216 |
| Fabric Weight (oz/yd$^2$) | 17.7 | 19.6 | 19.2 | 8.6 | 8.8 | 8.0 |
| Mesh Count (per in$^2$) | N/A | N/A | 70* | 5694* | 780 | 3479 |

Test Conditions

| Date of Test | June 3-9 | June 9-14 | June 14-17 | June 17-21 | June 21-25 | June 25-27 |
|---|---|---|---|---|---|---|
| Testing Duration (hrs) | 136.1 | 115.4 | 65.7 | 87.3 | 91.5 | 44.3 |
| Average Boiler Load (MW) | 417 | 472 | 484 | 495 | 375 | 368 |
| Average ESP Opacity (%) | 26.4 | 29.6 | 30.9 | 33.1 | 33.5 | 34.7 |
| Inlet Mass Loading (lb/Mbtu) | (0.040) | (0.063) | (0.058) | (0.075) | (0.068) | (0.089) |
| Average Flu Gas Moisture (%) | 10.3 | 11.3 | 10.5 | 11.6 | 10.6 | 10.6 |

Fabric Performance

| | | | | | | |
|---|---|---|---|---|---|---|
| Rate of Fabric ΔP (in H$_2$O/hr) | 0.65-0.90 | 0.10-0.25 | ~0.0 | 0.01-0.06<br><br>0.50-0.66 (with percent) | 0.20-0.03 | 0.03 |
| Outlet Mass Loading (lb/Mbtu) | 0.00010-0.00045 | 0.00010-0.00045 | 0.048-0.065 | 0.030-0.056<br><br>0.0075-0.0082 (with percent) | 0.018-0.025 | 0.040-0.059 |
| Fabric Collection Effeiciency (%) | 99.55-99.92 | 99.55-99.92 | 35-60 | 44-75 | 75-85 | 41-67 |

*Fig. 3*

APPARATUS AND METHOD FOR COLLECTING FLUE GAS PARTICULATE WITH HIGH PERMEABILITY FILTER BAGS

This application claims priority to U.S. Provisional Patent Application Serial No. 60/146,417, filed Jul. 29, 1999, entitled "Apparatus and Method for Collecting Flue Gas Particulate with High Permeability Filter Bags."

BRIEF DESCRIPTION OF THE INVENTION

This invention relates generally to the control of pollutants during a combustion process. More particularly, this invention relates to a technique of using high permeability filter bags in a barrier filter, such as a bag house.

BACKGROUND OF THE INVENTION

FIG. 1 illustrates a flue gas treatment system 10 constructed in accordance with the prior art. The system 10 is described in U.S. Pat. No. 5,158,580, which is assigned to the assignee of the present invention, and which is incorporated by reference herein. The flue gas treatment system 10 treats a flue gas exiting a boiler 12. The boiler 12 is of the type used in a utility fossil-fuel-fired power plant. Fuel supply 18 may be, for example, coal, oil, refuse derived fuel (RDF) or municipal solid waster (MSW). Boiler 12 also receives air 20 through inlet duct 22. Boiler 12 functions to combust the fuel 14 with air 20 to form flue gas 24, which exits boiler 12 by means of outlet duct 26. Boiler 12 also has a water inlet pipe 28 and a steam outlet pipe 30 for removing heat in the form of steam from boiler 12 generated by the combustion of fuel 14 with air 20.

Flue gas 24 is comprised of components of air and the products of combustion in gaseous form which include: water vapor, carbon dioxide, halides, volatile organic compounds, trace metals vapors, and sulfur and nitrogen oxides and the components of air such as oxygen and nitrogen. Flue gas 24 also contains particulate comprising unburned and partially combusted fuel which includes inorganic oxides of the fuel (known as flyash), carbon particles, trace metals, and agglomerates. Flue gas 24 may also contain particulate generated by the addition of removal agents 19 for sulfur oxide and other gas phase contaminates, such as halides and trace metal vapors. The removal agents 19 may be added into duct 21, duct 26, or into reactor vessel 17 by way of duct 23. Ducts 21, 23 and 26 may also convey solid materials if required for the selected removal agents 19 for the respective duct. Examples of sulfur oxide and other gas phase contaminate removal agents 19 include calcium carbonates, oxides and hydroxides, and sodium carbonates and bicarbonates. The particles or particulate in flue gas 24 can vary considerably in size, shape, concentration and chemical composition.

Flue gas 24 passes through duct 26 through reactor vessel 17 and through duct 27 as flue gas 25 to an inlet of electrostatic precipitator 34, which functions to charge and collect particles on electrodes within the electrostatic precipitator 34. Reactor vessel 17 may facilitate the chemical reaction of removal agents 19 with flue gas 24 to provide treated flue gas 25. Electrostatic precipitator 34 may remove, for example, from 90–99.9% of the particles and/or particulate. Therefore, flue gas 24 exits electrostatic precipitator 34 as treated flue gas 36 entering outlet duct 38. Treated flue gas 36 has roughly from 0.1–10% of the particulate or particles contained in the original flue gas 24 and also contains a certain amount of electrostatic charge which was transferred to it from the electrostatic precipitator 34. These particles were not collected within the electrostatic precipitator, but exited at outlet duct 38.

The particle concentration in the flue gas 36 exiting the electrostatic precipitator 34 is reduced significantly by the precipitator and contains a residual charge imparted by the precipitator. Particulate 36 leaving the electrostatic precipitator may lose charge if there is a long path between the electrostatic precipitator 34 and the barrier filter 44. To prevent this problem, a pre-charging unit 40 may be used. Gas 36 enters pre-charging unit 40 through inlet duct 38. The pre-charging unit 40 operates to charge particulate and then deliver it to a barrier filter 44.

Examples of acceptable barrier filters 44 include baghouses of the pulse-jet type, reverse flow, or shake-deflate type for periodically removing the dust cake accumulated on the surface of the bag filter. Prior art barrier filters are formed with bags having a nominal air permeability of 25 to 50 acfm/sq ft (actual cubic feet per minute of air flow per square foot of filter surface area at a pressure drop of one half inch water).

The flue gas 48 exiting barrier filter 44 passes through outlet duct 50, through fan 52 and through duct 54 to the inlet of smoke stack 46. Flue gas 48 exits smoke stack 46 as gas 58, which in turn mixes with the ambient air or atmosphere.

Fan 52 functions to overcome the additional pressure drop required to draw flue gas 48 across the barrier filter 44. Fan 52 also functions to draw flue gases 36 and 24 from electrostatic precipitator 34 and boiler 12 respectively. Fan 52 further functions to move flue gas 48 through duct 54 and out of smoke stack 46 as flue gas 58.

One problem associated with the system 10 is that the bags used in the barrier filter 44 have a relatively short life. Chemical degradation of the bag material and high pressure drop problems shorten bag life significantly. The causes for the degradation of the bag material are frequently unknown. For example, the causes for the degradation of bag material formed of RYTON (sold by American Fiber & Yarn) in the flue gas are not fully understood. New bag materials, such as TEFLON and glass, appear to provide improved resistance to chemical degradation. However, felted fabrics made of TEFLON are very expensive and both high efficiency TEFLON and glass filter felts still have high pressure drop problems.

The high pressure drop problem can be traced to the relatively poor efficiency of the existing ESP 34, which leads to high dust loading in the baghouse (i.e., barrier filter 44) and to the high air-to-cloth ratio associated with the baghouse. Thus, the high efficiency conventional felted RYTON filter needs to be cleaned frequently, leading to eventual bag blinding (i.e., penetration of dust into the felted fabric).

In view of the foregoing, it would be highly desirable to provide an improved barrier filter for use in a flue gas treatment system.

SUMMARY OF THE INVENTION

The invention includes a method of treating flue gas. Particulate is removed from the flue gas with a first particulate removal technique to produce treated flue gas. The treated flue gas is then applied to a high permeability barrier filter to remove additional particulate from the treated flue gas. The high permeability filter includes high permeability filter bags with air permeability greater than 75 actual cubic feet per minute of air flow per square foot of filter surface area at a pressure drop of one half inch water.

The invention also includes a flue gas treatment apparatus. The flue gas treatment apparatus includes a combustor to generate a flue gas. An electrostatic precipitator is connected to the combustor to remove particulate from the flue gas. A barrier filter is connected to the electrostatic precipitator to remove particulate from the flue gas. The barrier filter includes high permeability filter bags with air permeability greater than 75 actual cubic feet per minute of air flow per square foot of filter surface area at a pressure drop of one half inch water.

The fabric filter of the invention is easier to clean, provides reduced pressure drop, and is not subject to blinding. The filter fabric of the invention can also resist chemical degradation. The invention can be exploited in a variety of polishing baghouse operations where a baghouse is placed after a primary particulate collector to capture residual flyash.

BRIEF DESCRIPTION OF THE DRAWINGS

For a better understanding of the invention, reference should be made to the following detailed description taken in conjunction with the accompanying drawings, in which:

FIG. 3 illustrates exemplary performance results associated with different embodiments of the invention.

Like reference numerals refer to corresponding parts throughout the drawings.

DETAILED DESCRIPTION OF THE INVENTION

Figure 1:
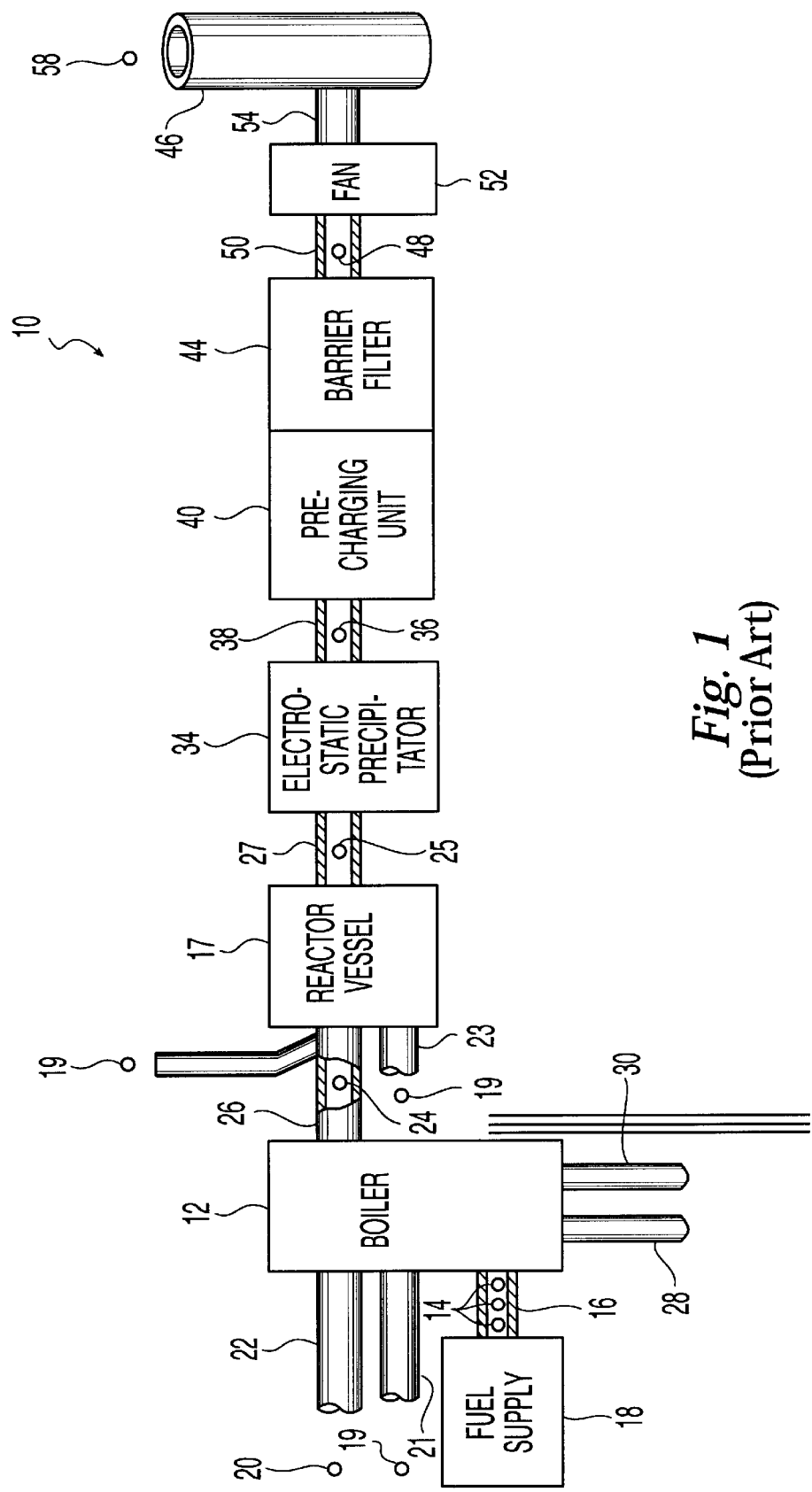
FIG. 1 illustrates a prior art flue gas treatment system.
Figure 2:
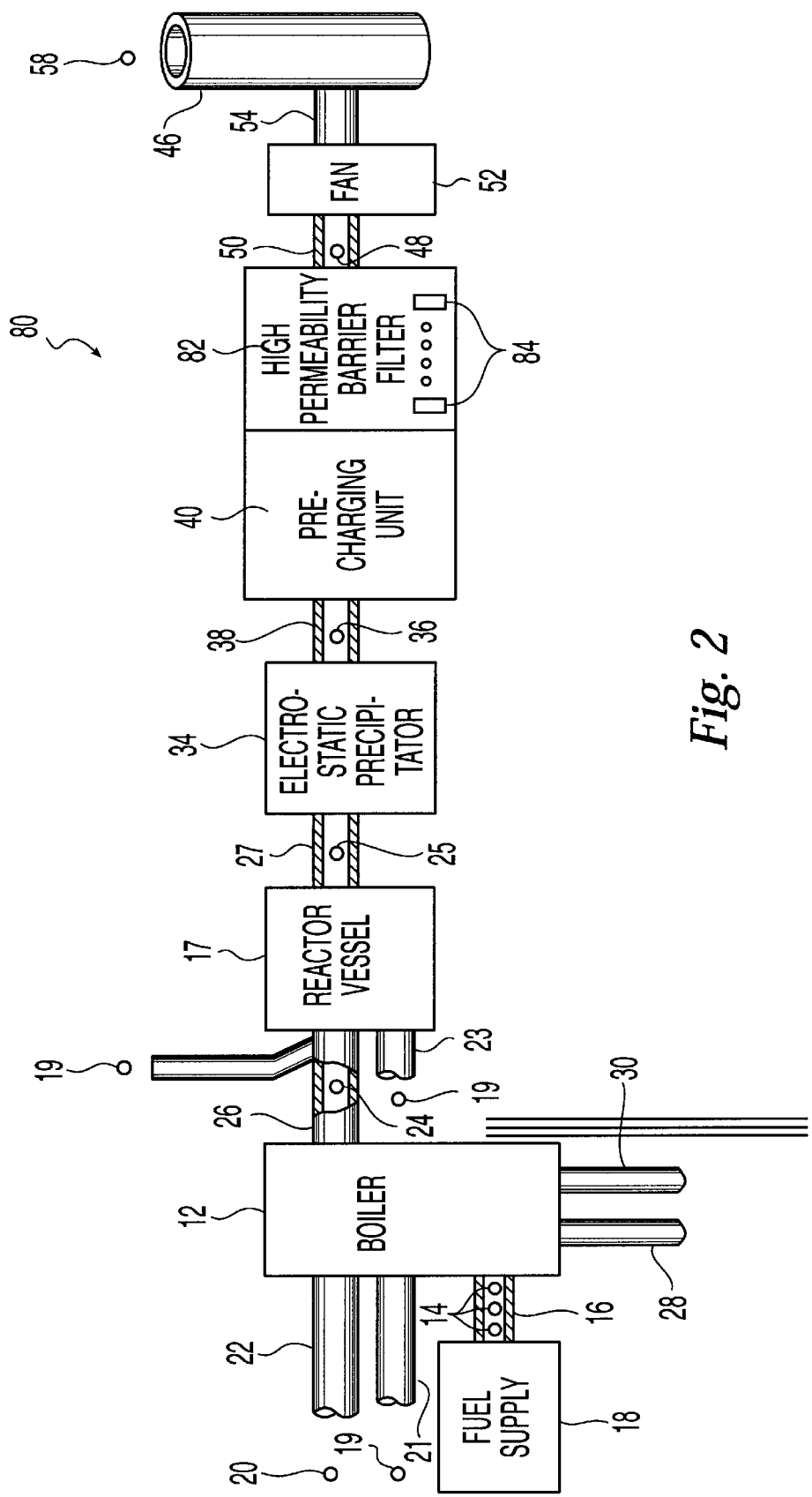
FIG. 2 illustrates a flue gas treatment system incorporating a high permeability barrier filter in accordance with the invention.

FIG. 2 illustrates a flue gas treatment system 80 incorporating a high permeability barrier filter 82 in accordance with an embodiment of the invention. The system 80 operates in the same manner as system 10 of FIG. 1, except that the barrier filter 44 of FIG. 1 is substituted with the high permeability barrier filter 82 of the invention. The high permeability barrier filter 82 has a set of high permeability filter bags 84.

As indicated above, prior art barrier filters are formed with a nominal air permeability of 25 to 50 acfm/sq ft (actual cubic feet per minute of air flow per square foot of filter surface area at a pressure drop of one half inch water). Such filters can be considered to have a tight weave or fiber structure. This tight weave is used in the prior art to insure maximum particulate collection.

The present invention departs from this approach by using high permeability filter bags 84 in the barrier filter 82. As used herein, a high permeability filter bag has air permeability of between 50 and 200 acfm/sq ft (actual cubic feet per minute of air flow per square foot of filter surface area at a pressure drop of one half inch water). The air permeability is preferably greater than 75 acfm/sq ft, and is preferably approximately 100 acfm/sq ft.

As discussed below, the high permeability filter bags 84 used to form the barrier filter 82 have a relatively open structure that is easier to clean. In addition, the barrier filter does not have the blinding and high pressure drop problems associated with prior art barrier filters.

The high permeability filter bags 84 of the invention may be formed from a woven felt fabric made of chemically resistant material, such as metal, RYTON, TEFLON and glass. The chemically resistant material withstands attack by flue gas components, such as oxidizing agents and acids. If chemical resistance is not an issue, the use of a loose weave or felt fabric will by itself provide lower pressure drop, a significant improvement over conventional lower permeability fabrics.

The high permeability filter bags 84 of the invention do not need to have the ultra high collection efficiency of a conventional baghouse since most of the flyash has already been collected in the upstream electrostatic precipitator 34.

The invention has been implemented with a barrier filter 82 including 600 filter bags 84. Initial results demonstrate that the high permeability filter bags of the invention (approximately 100 acfm/sq ft at one half inch water pressure drop) have about 50% lower pressure drop than conventional filter bags (approximately 40 acfm/sq ft at one half inch water pressure drop), even though they are cleaned 2 to 3 times less frequently.

FIG. 3 illustrates test results obtained in accordance various embodiments of the invention. RYTON felt was used as the base line or reference fabric associated with prior art implementations. The reference fabric was felt needled from 3 denier RYTON fibers on a RYTON scrim. (Denier is an expression that qualifies the weight, in grams, of 9000 meters of fiber. A larger denier means a heavier, thicker fiber.) The reference fabric had a permeability of 37 acfm/sq ft at one half inch water pressure drop. (All permeability measurements provided herein are based upon one half inch water pressure drop.) The fabric weight was 17.7 ounces/yard.

FIG. 3 also illustrates a first test fabric formed of 6-denier RYTON. This fabric is sold by American Felt and Filter as product 61RY/RY16. This is a lower density, but thick needled felt on RYTON scrim with about three times the permeability of the reference fabric. The larger diameter RYTON fibers provide chemical resistance. The 6-denier RYTON has a fabric permeability of 113 acfm/sq ft and a fabric weight of 19.6 ounces/square yard.

FIG. 3 also illustrates a second test fabric formed of woven glass. This fabric is sold by BGF Industries as a woven (mock leno weave) glass fabric with about three times the permeability of the reference fabric. The woven structure consists of smooth yarns, which are easier to clean. A smooth yarn is a continuous filament with minimal surface aberrations. This test fabric utilizes smooth glass yarns. The woven glass embodiment has a fabric permeability of 135 acfm/sq ft and a fabric weight of 19.2 ounces/square yard.

Test sample 3 in FIG. 3 is formed from woven RASTEX. RASTEX is sold by W. L. Gore & Associates. The woven RASTEX fabric is sold by Warshow and Sons as part A144. This filter material is a light-weight woven (four-harness satin) fabric consisting of fine yarns with more than five times the permeability of the baseline fabric. The fabric permeability is 208 acfm/sq ft and the fabric weight is 8.6 ounces/square yard. The wide open and smooth RASTEX yarns are easy to clean and are resistant to chemical attack.

Test sample 4 in FIG. 3 is a woven spun RYTON sold by Tetratec/Tex Technology, Inc. as part 231BRF. This is a lightweight fabric woven from spun RYTON yarns wit about twice the permeability of the baseline fabric. The spun yarn has more yarn surface than a smooth yarn like TEFLON, and therefore provides higher collection efficiency. The fabric permeability of test sample 4 is 66 acfm/sq ft and the weight is 8.8 ounces/square yard.

The final test sample, sample 5, is a woven TEFLON sold by Stern & Stern Industries as part T20. This fabric is similar to the reference fabric, but uses TEFLON instead of RASTEX. The fabric permeability of test sample 5 is 216 acfm/sq ft and the weight is 8/0 ounces/square yard.

The data in FIG. 3 shows that all of the high permeability test fabrics have lower short term rate of pressure rise compared to the reference fabric, but with the exception of test sample 1, they all had higher outlet emissions. Test fabric 1 has good performance to the extent that its rate of pressure rise is only one third that of the reference fabric, while outlet omissions of the two fabrics are substantially similar.

The data further shows that some of the high air permeability fabrics of the invention reduce pressure drop across filter bags, while still maintaining dust penetration across the filter bags at reasonable levels.

The most promising fabrics are those made of felted material, such as test sample 1 or woven fabrics with some degree of texturization, such as test sample 4. Texturization may be in the form of threads extending from a filament surface. Test fabric 1 had the best performance, with the rate of pressure drop rise only one fifth of the base fabric, while maintaining similar dust penetration. The larger diameter felt used in test sample 1 also provides better resistance to chemical degradation.

Smooth woven fabrics have very low pressure drops, but are too slick and too open to achieve reasonable particulate collection efficiency. Thus, fabrics made with woven glass, TEFLON, or RASTEX are preferably treated to create additional surface texturization for improved particulate collection. The surface texturization can be achieved through blending or mechanical processing.

The invention is preferably implemented with a high permeability barrier filter that keeps particulate emissions to below approximately 0.05 lb/MBtu or below 0.06 gms/cubic meter.

The invention provides additional flexibility in selecting "flex abrasion resistant" materials. Flex abrasion resistance is a measure of the ability of a fabric to withstand flexing of the fabric that occurs during cleaning and other operations that impose mechanical stress on the fabric. Glass fabrics have poor flex abrasion resistance, but TEFLON based fabrics have outstanding flex abrasion resistance.

The high permeability barrier filter of the invention allows a bag house to operate at a 20 to 80% lower pressure drop than that which is achieved using the reference fabric or other prior art materials. Thus, the invention is operated at a pressure drop of 1 to 12 inches of water.

Similarly, the invention allows for 20 to 80% lower drag compared to conventional fabrics used under the same conditions. Thus, the invention is operated at a drag value of less than 5 inches of water/ft/min. Test results over a six month period show no degradation in drag performance.

Those skilled in the art will appreciate that the present invention represents a radically different approach to solve both the bag life and pressure drop problem associated with prior art barrier filters. The invention utilizes filter fabrics with lighter weights and higher permeabilities. Fabrics with higher air permeabilities made with a more open needle felt or woven structure are contrary to current practice for a pulse-jet baghouse filter fabric, which tends to rely upon heavy fabrics with high particulate collection efficiency. A fabric with higher air permeability allows dust to penetrate more easily. In addition, it is easier for dust to be "blown out" and removed by pulse cleaning. Fabrics with significantly higher permeability may produce higher emissions. Therefore, there is a tradeoff between long term pressure drop and acceptable emissions. The invention facilitates the use of lighter fabrics that use more expensive, but chemically more resistant fibers, such as TEFLON. Since the overall fabric weight is lighter, less fabric is used and therefore the overall fabric price is competitive.

The high permeability barrier filter of the invention may be used in a variety of flue gas treatment systems. Those skilled in the art will appreciate that the implementation of FIG. 2, which combines an electrostatic precipitator 34 and the high permeability barrier filter 84, allows for the use of a relatively small high permeability barrier filter 84, since the electrostatic precipitator 34 operates to remove the bulk of the flue gas particulate. The high permeability barrier filter 84 of the invention may also be used as the primary particulate removal device, thereby obviating the need for the electrostatic precipitator 34. Since the electro-static precipitator 34 is absent in this implementation, the high permeability barrier filter 84 is larger.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A flue gas treatment system, comprising:
  a combustor to generate a flue gas;
  an electrostatic precipitator positioned downstream of said combustor and configured to receive said flue gas; and
  a barrier filter positioned downstream of, and separate from, said electrostatic precipitator to remove particulate from said flue gas, said barrier filter including a plurality of high permeability filter bags each having an air permeability of between 50 and 200 actual cubic feet per minute of air flow per square foot of filter surface area at a pressure drop of one half inch water and positioned outside of any electrical field.

2. The flue gas treatment system of claim 1 wherein said high permeability filter bags have an air permeability greater than 75 actual cubic feet per minute of air flow per square foot of filter surface area at a pressure drop of one half inch water.

3. The flue gas treatment system of claim 1 wherein said high permeability filter bags have an air permeability of approximately 100 actual cubic feet per minute of air flow per square foot of filter surface area at a pressure drop of one half inch water.

4. A method of treating flue gas, said method comprising:
  generating a flue gas;
  passing said flue gas through an electrostatic precipitator; and
  applying said flue gas to a barrier filter positioned downstream of, and separate from, said electrostatic precipitator, said barrier filter including a plurality of high permeability filter bags to remove particulate from said flue gas, wherein said plurality of high permeability filter bags each have an air permeability of between 50 and 200 actual cubic feet per minute of air flow per square foot of filter surface area at a pressure drop of one half inch water and are positioned outside of any electrical field.

5. The method of claim 4 wherein said applying step includes the step of applying said flue gas to a high permeability barrier filter with high permeability filter bags with air permeability greater than 75 actual cubic feet per minute of air flow per square foot of filter surface area at a pressure drop of one half inch water.

6. The method claim 4 wherein said applying step includes the step of applying said flue gas to a high permeability barrier filter with high permeability filter bags with air permeability of approximately 100 actual cubic feet per minute of air flow per square foot of filter surface area at a pressure drop of one half inch water.

* * * * *